Nov. 14, 1950      H. H. HOLLY      2,530,061
MOLDING DEVICE

Filed March 19, 1949      5 Sheets-Sheet 1

Inventor:
Harry H. Holly,
By Schroeder, Merriam,
Hofgren & Brady, Attys.

Nov. 14, 1950   H. H. HOLLY   2,530,061
MOLDING DEVICE

Filed March 19, 1949   5 Sheets-Sheet 2

Inventor:
Harry H. Holly,
By Schroeder, Merriam,
Hofgren & Brady, Att'ys.

Nov. 14, 1950 H. H. HOLLY 2,530,061
MOLDING DEVICE
Filed March 19, 1949 5 Sheets-Sheet 5

Inventor:
Harry H. Holly,
By Schroeder, Merriam,
Hofgren, & Brady, Attys.

Patented Nov. 14, 1950

2,530,061

UNITED STATES PATENT OFFICE 2,530,061

MOLDING DEVICE

Harry H. Holly, Chicago, Ill., assignor to Holly Molding Devices, Inc., a corporation of Illinois Application March 19, 1949, Serial No. 82,419

19 Claims. (Cl. 17—32)

1

This invention relates to a device for molding a plastic material such as ground meat to form articles such as meat patties, and relates particularly to such a device having an improved apparatus for forcing the plastic material from a hopper or other storage portion into a mold that is adapted to communicate with an opening in the hopper.

One of the features of this invention is the provision of an improved device for molding articles from plastic material wherein there is provided a hopper having an opening, a mold adapted to communicate with the opening, a movable feeder in the hopper adjacent this opening and having a ram portion, and apparatus for reciprocating the feeder from a first position where the ram portion is away from the opening to a second position where the ram portion is closer to the opening and back again for intermittently forcing plastic material into the mold, with the apparatus including means yieldable under a predetermined force for moving the feeder from a first position to a second position.

Another feature of the invention is the provision of such a device wherein the yieldable means is a resilient connector operably attached at one end to the feeder and operatively attached at the other end to a reciprocating member together with means for operating the reciprocating member in order to apply force to the connector to move the feeder from said first position to said second position, and a substantially rigid means connectable to the feeder and the reciprocating member for returning the feeder to the first position.

A further feature of the invention is the provision of such a device wherein the feeder is rotatably mounted and operated by a lever which is geared to the feeder for returning the feeder at a faster rate and through a greater arc than the corresponding rate and arc of rotation of the lever.

A specific feature of the invention is the provision of such an apparatus wherein there are provided a pair of rotatable feeders in the hopper with each feeder having a ram portion and gearing operably attached to the feeders for turning the feeders so that the ram portions move toward and away from each other in intermittently feeding plastic material into the mold, yieldable means such as a spring operably attached to the feeders for causing rotation of the ram portions toward each other and toward the mold opening, and gearing interconnecting the feeders so that the feeders are rotated at a

2 relatively rapid rate and through a relatively great arc in forcing plastic material from the hopper into the mold.

Other features and advantages of the invention will become apparent in the following description taken in conjunction with the accompanying drawings. Of the drawings.

The molding device shown and described herein may be used for molding small articles of any plastic material, but is particularly adaptable for molding wet, adhesive plastic material, such as ground meat. The device may be used in molding hamburger or pork sausage patties, but any kind of ground meat or similar material can be used in the device.

The molding device shown in the accompanying drawings comprises a hopper and feed portion A, a bottom portion B, housing the driving mechanism, a gear case C mounted on the bottom portion B and arranged at one side of the hopper and feed portion A, and a molding and transfer portion D located on the bottom portion B and in front of the hopper and feed portion A.

The hopper and feed portion A comprises a hopper 10 adapted to contain a relatively large quantity of plastic material, such as ground meat, having a bottom opening 10a, with the hopper being mounted on a supporting plate 11 which in turn is held on a base 12 by wing bolts 13 engaging ears 10c located at the bottom of the hopper 10. The supporting plate 11 and base 12 have their central portions spaced from each other to provide room for a slide plate 14 arranged therebetween. This space is provided by raised side portions 12a on the base and on which the supporting plate 11 rests. The slide plate 14 has ends extending considerable distances beyond the corresponding ends of the plate 11 and base 12.

The hopper 10, supporting plate 11 and base 12 may be easily assembled and disassembled for cleaning. In order to insure the proper positioning of the members, there are provided a pair of spaced posts 12b engaging holes in the side portions 12a, supporting plate 11 and hopper 10.

Figure 3:
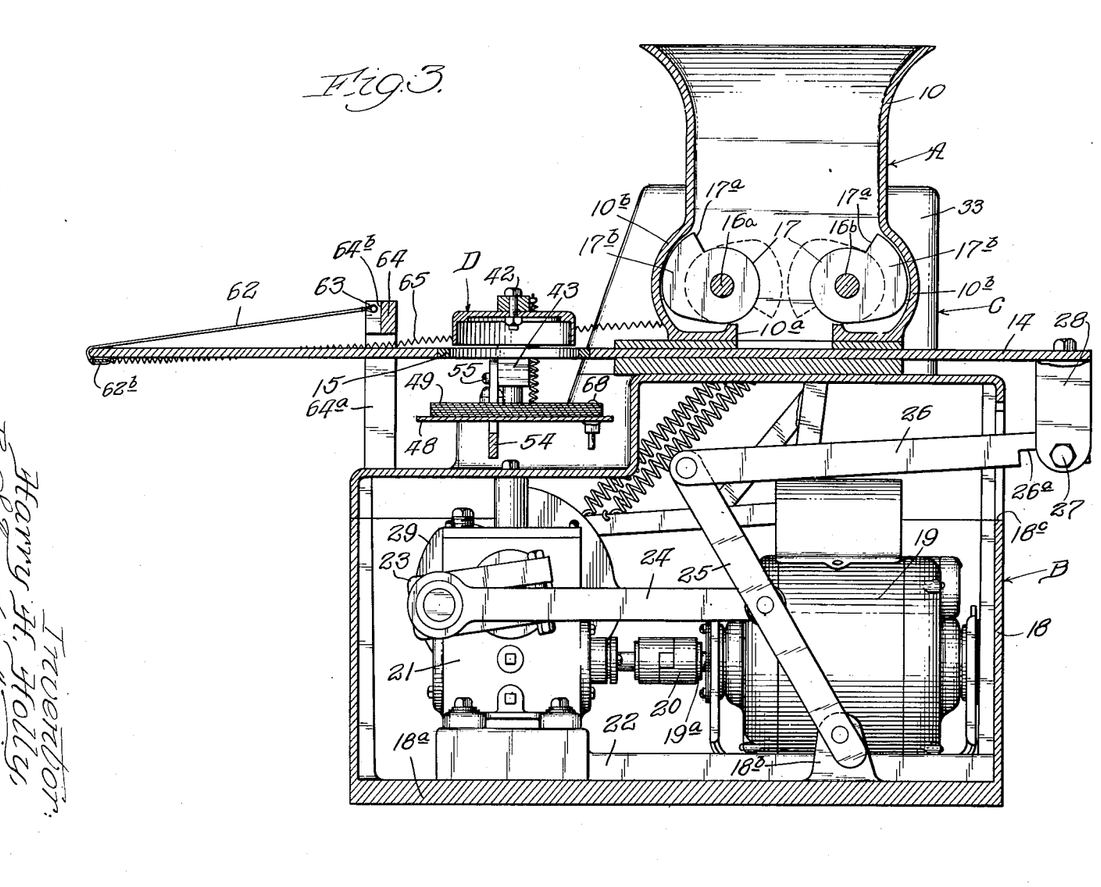
Fig. 3 is a vertical section taken substantially along line 3—3 of Fig. 2.

The slide plate 14 is provided with a mold opening 14a for receiving plastic material that is forced from the hopper through the hopper opening 10a. As shown in Fig. 3, the mold opening 14a is an opening in an annular plate 15 held in the slide plate 14. The slide plate 14 serves not only as a mold but also as a part of the transferring apparatus for transferring a portion of plastic material from the mold. One end of the slide plate also serves as one part of a back stop whose function will be described hereinafter.

Figure 1:
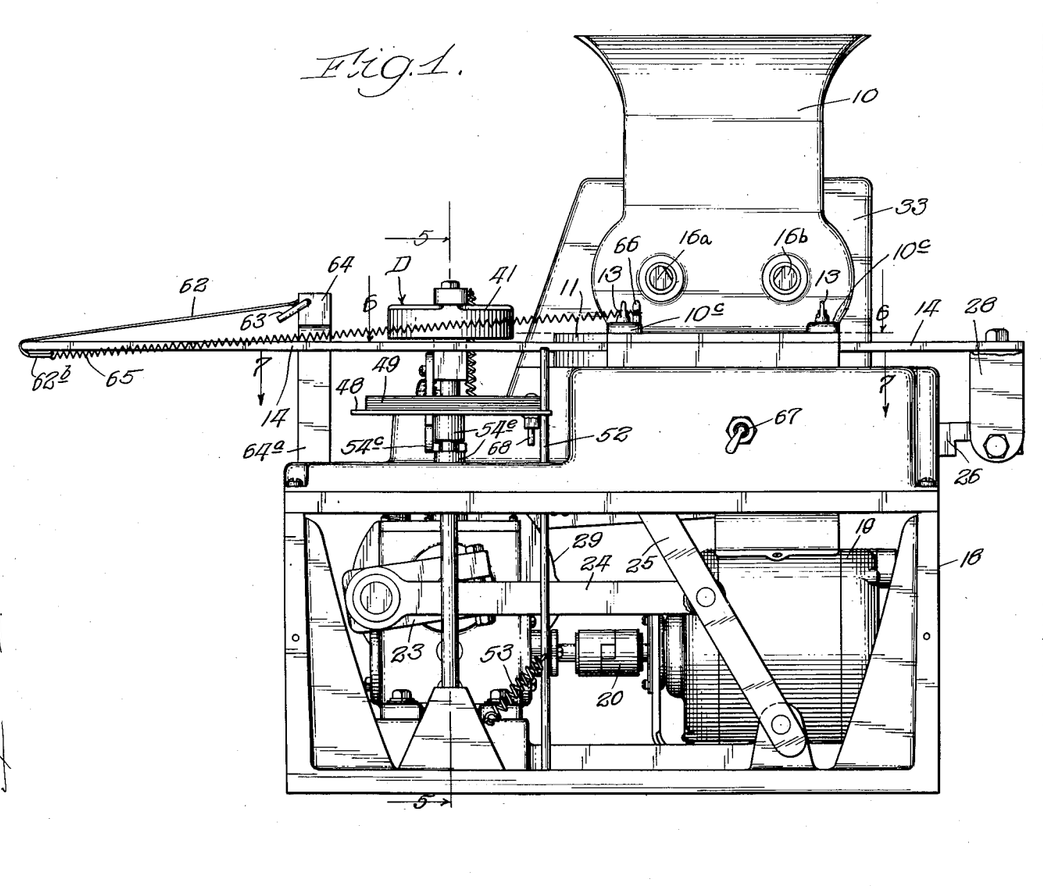
Fig. 1 is a side elevation of one embodiment of the device of this invention with a side plate removed at the bottom thereof to expose portions of the driving mechanism.
Figure 2:
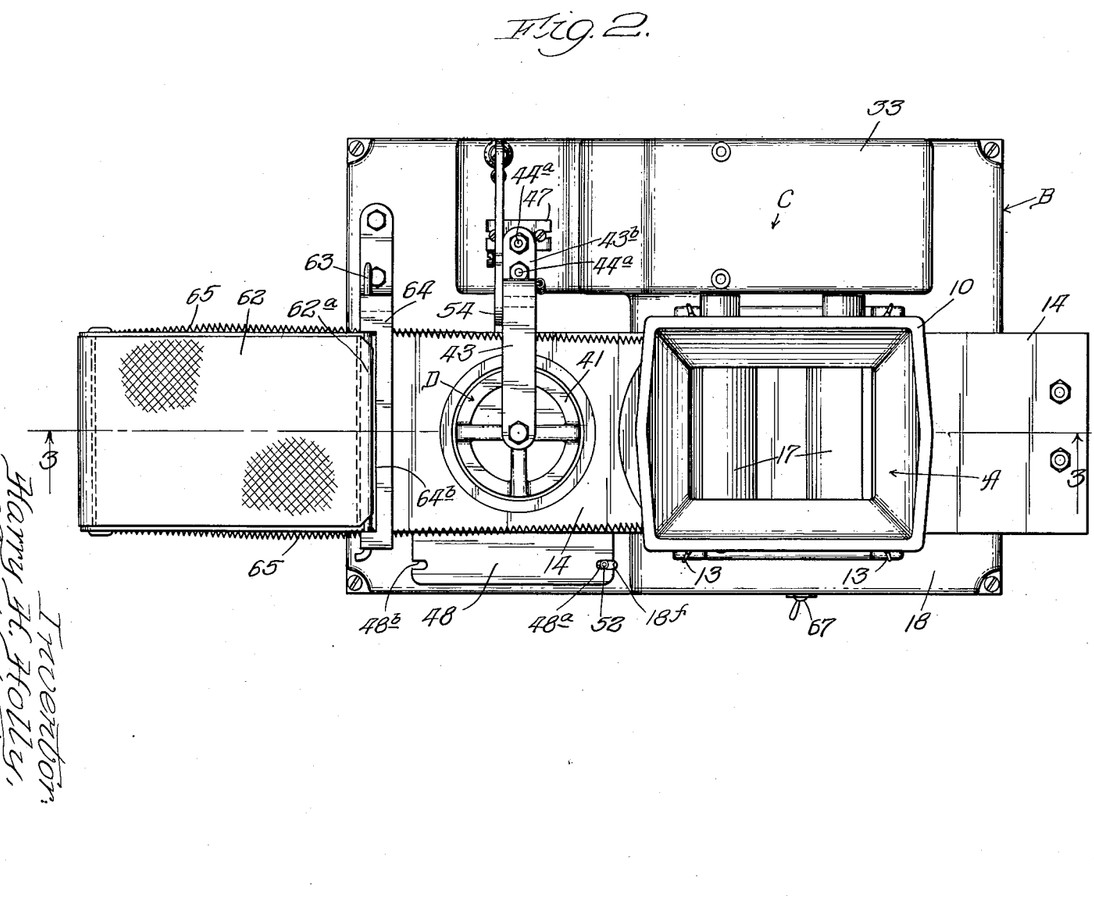
Fig. 2 is a plan view of the device.

The sides of the hopper 10 are provided at two opposite sides thereof with rounded portions 10b each having the shape of a section of a cylinder. These rounded portions are located adjacent the bottom of the hopper 10 and on opposite sides of the hopper opening 10a. Located within the mold 10 are a pair of rotatable axles 16a and 16b arranged substantially parallel to each other and above and on opposite sides of the hopper opening 10a. Mounted on each axle 16a and 16b is a feeder 17 with these feeders being rotatable with the axles 16a and 16b. Each feeder is provided with a ram portion 17a located on the periphery of the feeder. Each ram portion comprises a flat section that substantially coincides with the radius of a feeder 17. The outer surface of each feeder is substantially circular for a distance greater than 180° beginning at the base of the ram portion 17a. The surface opposite the ram portion 17a extends away from the center of the feeder and is curved to provide a protuberance 17b. As shown in Fig. 1, this protuberance is located within a rounded portion 10b when the feeder is in position with the ram portion 17a at substantially its greatest distance from the hopper opening 10a.

The bottom portion B of the molding device houses the major portion of the driving mechanism. This bottom portion is provided with a casing 18 including a bottom plate 18a. Mounted on this bottom plate is a motor 19 having a shaft 19a connected through a flexible coupling 20 to the shaft of a gear reducer 21. This gear reducer is mounted on a support 22 positioned on the bottom plate 18a and also serves to support the motor 19.

The gear reducer 21 is provided with a shaft 21a to which is attached a drive member 23 that is rotated by rotation of the shaft 21a. One end of the drive member 23 is rotatably attached to one end of an arm 24. The other end of the arm 24 is rotatably attached at substantially the midpoint of a second arm 25. This second arm has one end rotatably attached to a bracket 18b that is mounted on the bottom plate 18a of the casing 18. The other end of the arm 25 is rotatably attached to one end of a third arm 26. The opposite end of the third arm 26 is provided with a notched portion 26a on the bottom thereof which rests on and is in engagement with a bolt 27 located adjacent the bottom of a downwardly extending bracket 28 attached to the rear end of the slide plate 14. The third arm 26, which extends through an opening 18c in the casing 18, is provided with the notched portion 26a in order that a lost motion connection is provided between the third arm 26 and the slide plate 14.

Figure 4:
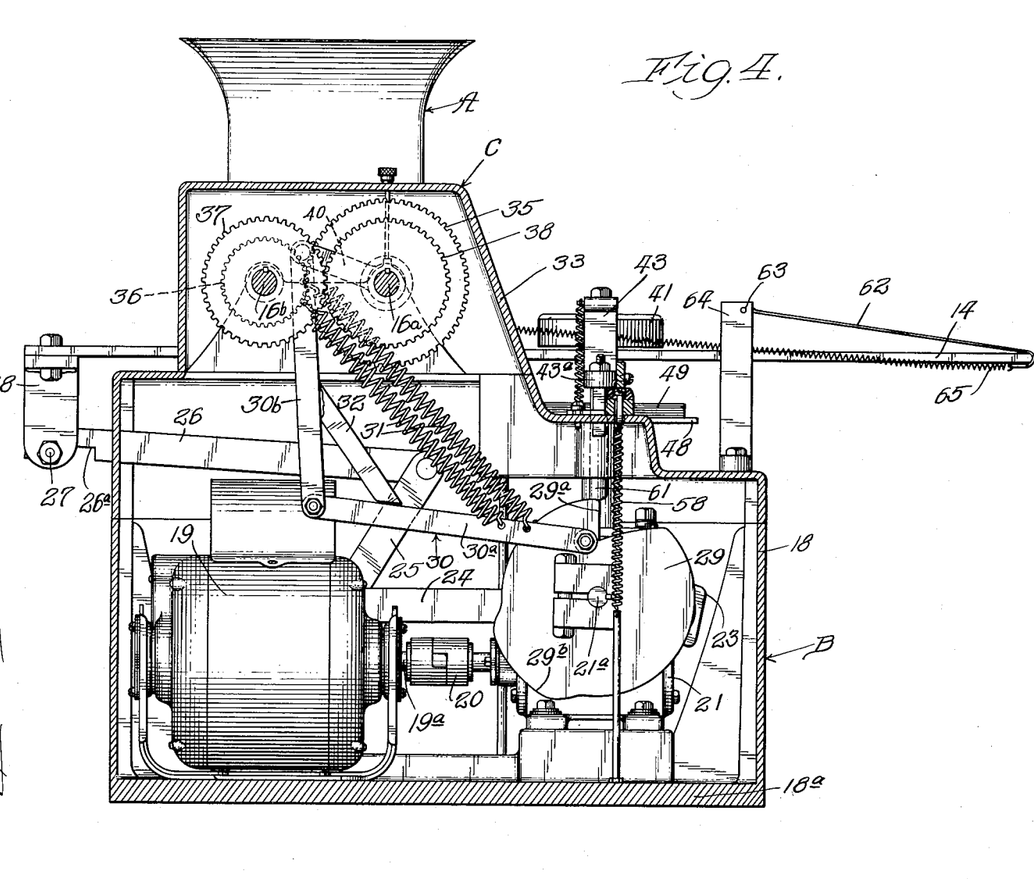
Fig. 4 is a vertical section taken substantially along line 4—4 of Fig. 5.

The end of the gear reducer shaft 21a opposite the end on which the drive member 23 is mounted has attached thereto a rotatable means such as a generally circular cam plate 29. This cam plate is provided with a depression such as a relatively deep notch 29a on one portion of its periphery and a raised portion 29b on another part of the periphery spaced less than 180° from the notch 29a. The raised portion 29b has smoothly inclined sides and a top of an arcuate shape blending into these sides. There is provided a linkage member 30 formed of two legs 30a and 30b having one end of each rotatably attached together and the opposite end of one leg 30a rotatably attached to the cam plate 29 at a point adjacent the bottom of the notch 29a. The opposite end of the other leg 30b extends up into the gear case C. The two legs 30a and 30b of the linkage member 30 are urged together by a pair of relatively heavy coil springs 31 arranged substantially parallel to each other and having their ends attached to spaced points on the legs 30a and 30b. Other types of urging means may of course be employed if desired. In these cases the springs are resistingly deformable under force. Means are provided for limiting the extent of movement of the legs 30a and 30b toward each other. As shown in Fig. 4, this limiting means comprises a stop member in the form of a bar 32 attached to one leg 30a as by welding or the like and extending to a point where its other end is abutted by the other leg 30b.

The gear case C is provided at one side of the hopper 10. This gear case comprises a removable housing 33 that is spaced from the hopper 10. The axles 16a and 16b extend through the side of the hopper 10 and into the housing 33. Each axle is separable at a point between the hopper 10 and housing 33 and is held together by an annular connector 34. There is provided a first gear 35 within the housing 33 and mounted for rotation on an axle 16a. This first gear 35 is located adjacent the wall of the housing that is adjacent the hopper 10. Also within the housing, there is provided a second gear 36 mounted on the other axle 16b for rotation therewith. The first gear 35 meshes with the second gear 36 and the first gear has a circumference that is considerably greater than the circumference of the second gear. In the embodiment shown, the circumference of the first gear 35 is approximately twice the circumference of the second gear 36. Mounted on the same axle 16b which holds the second gear 36 is a third gear 37. This third gear is positioned adjacent the side of the housing that is furthest from the hopper 10. The third gear 37, which has a diameter larger than that of the second gear 36, meshes with a fourth gear 38 that is of substantially the same diameter as that of the third gear 37. This fourth gear 38 is mounted on the axle 16a which holds the first gear 35. This fourth gear 38 is rigidly fixed on the axle 16a for rotation therewith.

The first gear 35 is provided with an annular collar 39 through which the axle 16a extends, with this collar extending from the first gear 35 to a point approximately midway between gears 35 and 38. Rigidly attached to the inner end of this annular member 39 is a lever 40. When the ram portions 17a are in the position shown in Fig. 3, this lever will extend upwardly and at a small angle to the horizontal as is shown in Fig. 4. The leg 30b of the linkage member 30 that is opposite the cam plate 29 is rotatably attached to the outer end of the lever 40.

When the slide plate 14 is moved to a position so that the opening 14a is beneath the hopper opening 10a, the mold opening is filled with the plastic material from the hopper 10. The slide plate is then moved to the position shown in the drawings. In order to remove the portion of plastic material from within the mold opening 14a, there is provided a transferring apparatus. As shown, this apparatus comprises a knock-out member 41 of substantially circular shape normally positioned over the mold opening 14a, as shown in Fig. 3. This knock-out member may be of any shape desired, but is generally the same shape as that of the mold opening 14a. Thus both the knock-out member and the mold opening may be circular, square, rectangular and the like. It is, of course, not necessarily required that the knock-out member be the same shape as the mold opening so long as the member is capable of removing the portion from the mold opening. The knock-out member is connected by means of a bolt 42 to the end of a lever such as an arm 43. This arm includes a horizontal portion to the end of which the knock-out member 41 is attached and a vertical portion extending downwardly at the side of the slide plate 14. The lower end of the arm is provided with a horizontal portion 43a. This portion is attached as by means of a bolt 44a to a downwardly extending, substantially square leg 45 extending through an opening 18d in the top of casing 18. This leg 45 serves to guide the vertical movement of the arm 43 and the attached knock-out member 41. The arm 43 and knock-out member are urged in a downwardly direction by a resilient means such as coil spring 46 attached to the outer end of the arm 43 at a point between the knock-out member 41 and the leg 45. This spring has its other end attached to the top of the casing 18.

Figures 5, 6, 7:
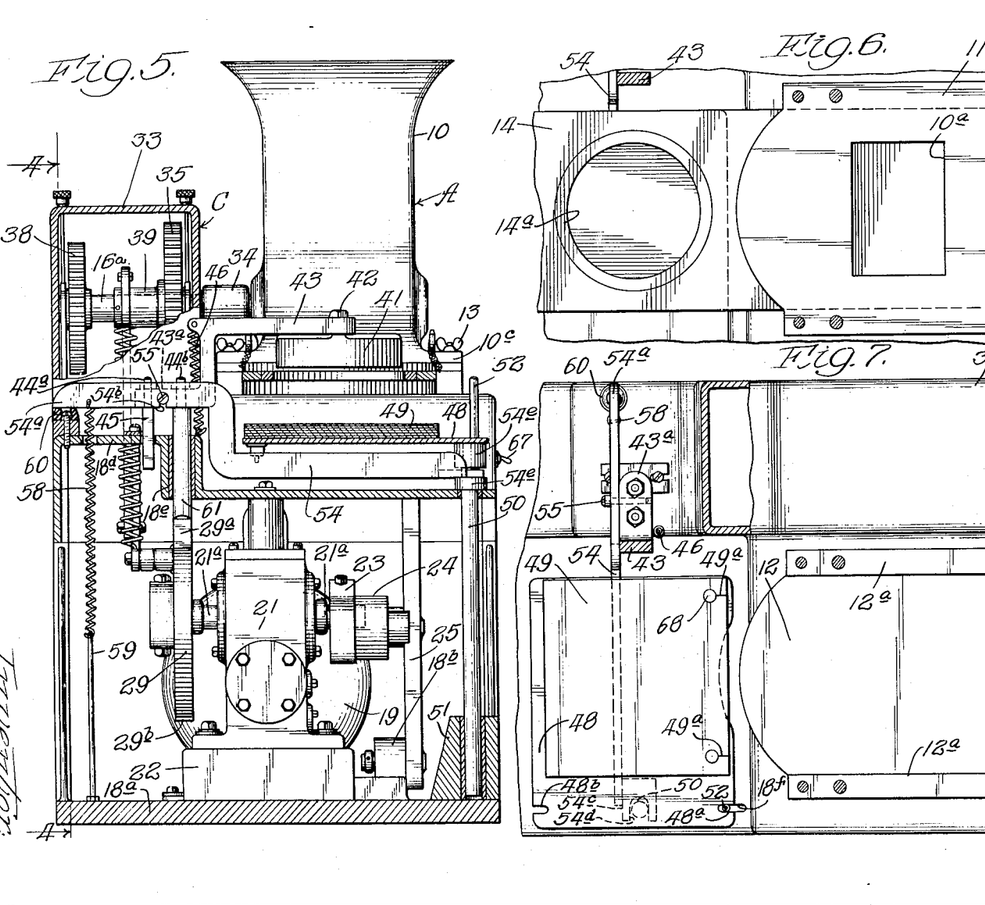
Fig. 5 is a vertical section taken substantially along line 5—5 of Fig. 1.
Fig. 6 is a horizontal section taken substantially along line 6—6 of Fig. 1.
Fig. 7 is a section taken substantially along line 7—7 of Fig. 1.

Immediately beneath the knock-out member 41 there is located a platform 48 upon which is positioned a stack 49 of sheets of paper. This platform and the paper thereon serves as a supporting member for the portion of plastic material that is removed from the mold opening 14a. At substantially the midpoint of the outer edge of the platform 48, there is attached a downwardly extending rod member 50 of circular cross-section. This rod member extends through an opening in the top of the casing 18 and has its bottom end slidably and rotatably held by a guide 51 mounted on the bottom plate 18a of the casing 18. The engagement of the rod member 50 with the guide member 51 and the top of the casing 18 insures movement of the platform 48 in a substantially vertical path. At one outer corner of the platform 48 there is provided a rod member 52 held in an open-ended slot 48a in this corner of the platform. This rod member extends down through a slot 18f in the casing 18 and has its bottom end positioned on the bottom plate 18a of the casing 18. This rod member 52 serves as a guide to prevent turning of the platform 48 around the first rod member 50. The bottom portion of the rod member 52 is provided with a coil spring 53 extending from the rod member to the guide 51. This spring serves to hold the rod member 52 in engagement with the platform slot 48a to prevent rotation of the platform on its supporting rod 50. In this position the rod member 52 is located at the inner end of the casing slot 18f. The platform 48 is also provided with a second slot 48b on the opposite edge of the platform. The two slots 48a and 48b and the rod 50 are substantially aligned as shown in Fig. 7. The rod member 52 engaging the slot 48a serves with the rod member 50 to cause movement of the platform in a vertical path. The rod member 52 may be disengaged from the slot 48a by pressing outwardly on the top end of the rod member 52. After the rod member has become disengaged from the slot 48a, the platform may be turned on the rod member approximately 180° until the rod member 52 engages the opposite slot 48b. In this position the platform 48 is held in an outwardly extending position so that the stack 49 of paper may be placed on the platform.

In order to cause the platform 48 to move in a vertical path and toward the slide plate 14, there is provided a lever such as an arm 54 having a horizontal portion extending beneath the platform, a vertical portion extending upwardly beside the platform and an outwardly extending horizontal portion 54a located in contact with the adjacent side of the horizontal portion 43a of the arm 43 and extending therebeyond. There is provided a screw 55 extending through the arm portion 54a and held in the other arm portion 43a. The arm portion 54a is provided with a slot 54b extending around the screw 55 and through the bottom surface of the arm portion 54a. This slot engages the screw 55 when the parts are in the position shown in Fig. 5, but permits arm portion 43a to drop out of engagement with the arm portion 54a. The end of the arm 54 opposite the horizontal arm portion 54a is provided with a bracket 54c having a slot 54d embracing the rod member 50. At the top and bottom of the bracket there are provided a pair of annular rubber bumpers 54e, with the bracket 54c and bumpers 54e being freely slidable on the rod member 50. The bumpers serve to reduce noise and vibration in the apparatus and the bottom bumper 54e serves as a support for the corresponding end of arm 54.

The arm 54 is urged downwardly by means of a resilient means such as a spring 58 having one end attached to the arm portion 54a at a point adjacent the outer end thereof and the other end attached to a rod 59 fastened to the bottom plate 18a of the casing 18. The extreme end of the arm portion 54a normally abuts against a button 60 of rubber or other resilient material, with this button also being used to absorb shock and reduce noise and support the corresponding end of arm 54.

In order to cause movement of the arms 43 and 54 and thus of the knock-out member 41 and platform 48, there is provided an actuating member 61 attached to the arm portion 43a by means of a screw bolt 44b. This actuating member 61, as shown, is a rod that is slidably held in an enlarged portion 18e of the casing 18 and is vertically movable therein. The bottom of the actuating member 61 rests against the periphery of the cam plate 29. The cam plate, with notch 29a and raised portion 29b, serves as a timing device for operating the actuating member 61.

In order to remove the molded article, such as a ground meat patty, from the device there is provided a removing apparatus which includes a conveyor means such as a flexible transfer sheet 62 which may be of cloth impregnated with wax or other sealing and non-absorbent material, and is preferably similar to that shown in my prior Patent 2,338,939. One end of this sheet is held by means of a removable pin 63 extending through a loop 62a provided in the one end of the sheet 62. This removable pin 63 is held in a bracket 64 having a top portion located above the slide plate 14 and provided with a downwardly extending leg 64a located at one side of the slide plate 14 and attached to the top surface of the casing 18. As shown, the top portion of the bracket is provided with a cut out portion 64b to provide room for the loop 52a and the part of the pin 63 held within the loop. The flexible sheet 62 and the part of the slide plate 14 which is adjacent thereto and which will be over the platform 48 when the mold plate has moved furthest to the right (Fig. 1) serves as a back stop.

The flexible sheet 62 extends from the pin 63 around the adjacent end of the slide plate 14. When the slide plate is in the position shown in the drawings, this end of the sheet 62 passes around the adjacent end of the slide plate 14. This end of the sheet 62 is provided with a reinforcing member 62b. Extending from the lower end of the sheet 62 are a pair of coil springs 65 with each spring being attached adjacent a corner of the sheet 62. Each of these springs 65 extends back alongside the slide plate 14, and has the other end removably held on a post 66. Each post 66 is mounted on one of the brackets 10c of the hopper 10. When the slide plate 14 is in the position shown in the drawings, the spring 65 will be extended as shown. When the slide plate is moved toward the mold 10 to bring the mold opening 14a under the hopper opening 10a, the spring 65 will pull the sheet 62 back to a position where it covers the end of the slide plate that is directly above the platform 48.

The device is so proportioned that when the slide plate is in the position shown in the drawings the feeders 17 are turned back to a position where the ram portions 17a are furthest from the mold opening 10a and the arms 24, 25 and 26 have been moved to the left as shown in Fig. 3. In this position the actuating member 61 is just ready to drop down in the notch 29a on further movement of the cam plate 29 in a counterclockwise direction as viewed in Fig. 4.

In operating the device the hopper 10 is filled with a plastic material such as ground meat. The electrical circuit to the motor 19 is closed by operating the switch 67. The motor 19 causes the cam plate 29 to operate counterclockwise (Fig. 4) thus dropping the actuating member 61 into the notch 29a. The dropping of the actuating member causes the knock-out member 41 to be pulled sharply downwardly under the urging of spring 46. The knock-out member enters the mold opening 14a and dislodges the portion of plastic material that is held therein. Further movement of the cam plate 29 causes the actuating member 61 to raise the knock-out member 41 from the mold opening. This portion of plastic material falls onto the topmost sheet of paper of the stack 49. Further operation of the motor 19 rotates the drive member 23 and urges arms 24, 25 and 26 to the right as shown in Fig. 3. Because of the provision of the notch 26a in the outer end of arm 26, there is a period during which the slide plate 49 is not moved. This period is sufficient for the knock-out member 41 to be raised from the mold opening 14a. As the drive member 23 continues to rotate, the arms 24, 25 and 26 are forced rearwardly and pull the slide plate rearwardly until the drive member 23 is in a position substantially diametrically opposite that shown in Fig. 3, and the mold opening 14a is in communication with the hopper opening 10a.

During this operation of the motor, the cam plate 29 is rotated so that the end of the leg 30a of the linkage member 30 that is attached to the cam plate is moved downwardly. This downward movement applies tension to the springs 31 and thus to the lever 40 to cause rotation of the lever in a counterclockwise direction, as shown in Fig. 4. The rotation of the lever 40 causes rotation of the first gear 35 to which the lever is operatively attached. The rotation of the first gear 35 causes rotation of the second gear 36 with which the first gear is in meshing engagement. As the second gear 36 is considerably smaller than the first gear 35, the second gear operates at a faster rate and through a greater arc than does the first gear 35. The rotation of the second gear 36 causes rotation of the meshing third and fourth gears 37 and 38, respectively. As gears 36 and 37 are rigidly mounted on shaft 16b and gear 38 is mounted on its shaft 16a, these movements of the gears cause the feeders 17 to be rotated so that the ram portions 17a move inwardly toward each other and downwardly toward the mold opening 10a. When the movement of the feeders is relatively free, as happens when only a small supply of plastic material is in the hopper 10, the feeders are in the position shown by dotted lines in Fig. 3 at the end of their movement. Because of the provision of the springs 31, however, additional resistance caused by large and compact supplies of plastic material, or other factors, will cause the feeders to move to a position short of that shown by these dotted lines. Sufficient pressure is applied to the plastic material at all times, however, irrespective of the amount of resistance encountered. The springs are of such strength to insure this pressure being applied. The feeders 17 will be turned to their extreme inward position when the end of the leg 30a that is attached to the cam plate 29 is in a position approximately diametrically opposite to that shown in Fig. 4. Further operation of the cam plate causes the feeders to be returned to their initial position. This returning is insured by the leg 30a abutting against the adjacent end of the bar 32 which is attached to the opposite leg 30b.

After the portion of plastic material has been forcibly ejected from the mold opening 14a by the action of the knock-out member 41, the portion of material is pressed against the sheet 62 that forms a part of the back stop so that it adheres thereto. This adherence is caused by pressure of the platform 48 through the stack 49 of paper. In order to accomplish this the platform 48 is raised until the portion is pressed between the stack of paper and the flexible sheet 62, which is now backed up by the adjacent end of the slide plate 14. This adjacent end and the sheet 62 thus form a back stop against which the portion of plastic material is pressed. In order to bring about this pressure, the rotation of the cam plate 29 causes the actuating member 61 to be forced upwardly. This upward movement of the actuating member 61 is caused by engagement of the bottom of the actuating member with the raised portion 29b of the cam plate 29. Upward movement of the actuating member 61 causes both the knock-out arm 43 and the platform arm 54 to be raised upwardly because of engagement of the slot 54b with the screw 55 that is held in the knock-out arm portion 43a. As the arm 54 moves upwardly, the outer end thereof, which bears against the bottom of the platform 48 through the top bumper 54e, rotates around the screw 55 and raises the platform 48 so that the portion of plastic material is pressed between the stack 49 of paper and the bottom of the slide plate 14. Although the thickness of the stack 49 of paper will vary, the pressure on the portion of the material will be constant because of the provision of the spring 58. This spring is of such a strength that when the pressure on the portion of material begins to exceed a predetermined maximum the spring will stretch and permit the end portion 54a of the arm 54 to raise from the rubber button 60. During this action the portion of material is usually but not necessarily flattened. It may be flattened to any desired degree by regulating the strength of spring 58. The principle reason for pressing the portion of plastic material against the sheet 62 is to cause the portion to adhere thereto so that it can be removed from the apparatus.

In each downward and upward movement of the actuating member 61 caused by its engagement with the notch 29a and the raised portion 29b, respectively, the screw 55 will disengage and engage the slot 54b. This slot permits the arm portion 43a to fall below the arm portion 54a when the knock-out portion 41 is being operated.

Each time the slide plate 14 moves to the right (Fig. 3) preparatory to raising the platform 48, the springs 65 cause the flexible sheet 62 to be drawn over the end of the plate 14 adjacent the flexible sheet. Thus by the time the portion of material has been raised by the platform to the slide plate 14, the flexible sheet 62 is in position to receive the portion of material. This portion of material is sufficiently adhesive, especially when the material is ground meat, to adhere to the flexible sheet 62 and also the topmost sheet of paper in the stack 49 of paper. This topmost sheet remains adhered to the portion of material when the platform 48 is lowered. Subsequent movement of the slide plate 14 to the left (Fig. 3) causes the flexible sheet 62 to be withdrawn to the position shown in Fig. 3. As the sheet 62 is pulled around its end of the slide plate 14, the adhered patty is dislodged from the sheet 62. The patty is thus withdrawn from on top of the stack 49 and falls onto a support (not shown) with the adhered sheet of paper still attached thereto. With this arrangement, operation of the device causes patties of plastic material such as ground meat to be stacked one on top of the other with each portion being separated by a sheet of paper.

The device is so arranged that the platform 48 is held in raised position until the portion of material and the adhered sheet of paper is almost completely withdrawn from the top of the stack 49 of paper. This operation is provided for by making the raised portion 29b of the cam plate 29 of relatively great length as shown, for example, in Fig. 4. Such operation is of great advantage as it prevents accidental dislodgement of the portion of material from the flexible sheet 62 with subsequent fouling of the device.

In order that the paper sheets may be withdrawn easily from the stack 49, each sheet is provided with two slits 49a extending substantially parallel to each other and outwardly to the edge of the paper that is nearest the center of the device. These slits are substantially parallel to the direction of motion of the slide plate 14 and the flexible sheet 62. The stack of paper is held in position by means of a pair of bolts 68, with each bolt engaging openings at the inner ends of aligned slits 49a on the stack of paper. These bolts are sufficient to prevent the stack of paper from becoming accidentally dislodged but permits each sheet of paper to be successively withdrawn from the stack beginning with the topmost sheet.

As can be seen from the above description, the device of this invention operates continuously to mold patties of plastic material. After these patties are molded they are ejected from the device in such a manner as to be arranged in a stack at the side of the device. This device may be used for molding any plastic material, but is particularly adapted for molding and shaping patties of ground meat such as hamburger. As all the operating parts of the device are interrelated, the device is simple to construct so that the proper timing is achieved. Thus the mold opening 14a is always in communication with the hopper opening 10a during the time when the feeders 17 are forcing plastic material out the opening 10a. The mold opening 14a is always under the knock-out member 41 during engagement of the actuating member 61 with the notch 29a in the cam plate 29. Similarly, the slide plate 14 is at rest with the mold opening 14a in communication with the hopper opening 10a during the time the portion of plastic material is being pressed between the stack 49 of paper and the back stop which includes the flexible sheet 62.

This application is related to my copending application Serial No. 82,420, filed March 19, 1949, which claims certain elements of the device described herein.

While I have shown and described certain embodiments of my invention, it is to be understood that it is capable of many modifications. Changes, therefore, in the construction and arrangement may be made without departing from the spirit and scope of the invention as described in the appended claims.

I claim:

1. A device for molding articles from plastic material, said device comprising: a hopper for the plastic material having a mold opening; a rotatable feeder in the hopper adjacent said opening having a ram portion; a mold adapted to communicate with said opening; a connector operably attached at one end to said feeder at a point spaced from the center of rotation of the feeder; a reciprocating member to which the other end of said connector is attached; means for operating said reciprocating member to apply force to said connector and thus rotate said feeder from a first position where said ram portion is away from said opening to a second position where said portion is closer to said opening for forcing plastic material through said opening into the mold, said connector being yieldable when said plastic material provides a resistance of a predetermined magnitude to movement of said feeder from said first position to a second position; and a substantially rigid means operably connectable to said feeder and said reciprocating member for returning the feeder to said first position upon further operation of said reciprocating member.

2. A device for molding articles from plastic material, said device comprising: a hopper for the plastic material having a mold opening; a rotatable feeder in the hopper adjacent said opening having a ram portion; a mold adapted to communicate with said opening; a resilient connector operably attached at one end to said feeder at a point spaced from the center of rotation of the feeder; a reciprocating member to which the other end of said resilient connector is attached;

means for operating said reciprocating member to apply force to said resilient connector and thus rotate said feeder from a first position where said ram portion is away from said opening to a second position where said portion is closer to said opening for forcing plastic material through said opening into the mold; and a substantially rigid means operably connectable to said feeder and said reciprocating member for returning the feeder to said first position upon further operation of said reciprocating member.

3. A device for molding articles from plastic material, said device comprising: a hopper for the plastic material having a mold opening; a rotatable feeder in the hopper adjacent said opening having a ram portion; a mold adapted to communicate with said opening; a resilient connector operably attached at one end to said feeder at a point spaced from the center of rotation of the feeder, a rotatable member to which the other end of said resilient connector is attached at a point spaced from the center of rotation of said member; means for rotating said rotatable member to apply force to said resilient connector and thus rotate said feeder from a first position where said ram portion is away from said opening to a second position where said portion is closer to said opening for forcing plastic material through said opening into the mold; and a substantially rigid means operably connectable to said feeder and said rotatable member for returning the feeder to said first position upon further operation of said reciprocating member.

4. A device for molding articles from plastic material, said device comprising: a hopper for the plastic material having a mold opening; a mold adapted to communicate with said mold opening; a rotatable feeder in the hopper adjacent said opening having a ram portion, said ram portion being reciprocable from a first position where said portion is away from said opening to a second position where said portion is closer to said opening and back again for intermittently forcing plastic material through said opening into said mold; a lever operably attached to said feeder for reciprocating said feeder; a rotatable member spaced from said feeder; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs toward each other; and means for rotating said rotatable member for reciprocating said feeder, said ram portion being in said first position when said legs are closest together with the point of connection of the linkage member to the rotatable member being substantially closest to said feeder, and said ram portion being in said second position under the urging of said spring when said point of connection is substantially furthest from said feeder.

5. A device for molding articles from plastic material, said device comprising: a hopper for the plastic material having a mold opening; a rotatable feeder in the hopper adjacent said opening having a ram portion; a lever rotatably mounted adjacent said feeder; a mold adapted to communicate with said opening; a resilient connector operably attached at one end to said lever at a point spaced from the center of rotation of the feeder; a reciprocating member to which the other end of said resilient member is attached; speed accelerating gearing operably connecting said lever to said feeder for reciprocating said feeder at a faster rate and through a greater arc than said lever; means for operating said reciprocating member to apply force to said resilient connector and thus rotate said feeder from a first position where said ram portion is away from said opening to a second position where said portion is closer to said opening for forcing plastic material through said opening into the mold; and a substantially rigid means operably connectable to said feeder and said reciprocating member for returning the feeder to said first position upon further operation of said reciprocating member.

6. A device for molding articles from plastic material, said device comprising: a hopper for the plastic material having a mold opening; a rotatable feeder in the hopper adjacent said opening having a ram portion; a lever rotatably mounted adjacent said feeder; a mold adapted to communicate with said opening; a gear operably attached to said lever for rotation therewith; a second gear operably attached to said feeder and said first gear and arranged for rotation at a faster rate and through a greater arc than said first gear to rotate said feeder at a faster rate and through a greater arc than said lever; a resilient connector operably attached at one end to said lever at a point spaced from the center of rotation of the feeder; a rotatable member to which the other end of said resilient connector is attached at a point spaced from the center of rotation of said member; means for rotating said rotatable member to apply force to said resilient connector and thus rotate said feeder from a first position where said ram portion is away from said opening to a second position where said portion is closer to said opening for forcing plastic material through said opening into the mold; and a substantially rigid means operably connectable to said feeder and said rotatable member for returning the feeder to said first position upon further operation of said rotatable member.

7. A device for molding articles from plastic material, said device comprising: a hopper for the plastic material having a mold opening; a mold adapted to communicate with said mold opening; a rotatable feeder in the hopper adjacent said opening having a ram portion, said ram portion being reciprocable from a first position where said portion is away from said opening to a second position where said portion is closer to said opening and back again for intermittently forcing plastic material through said opening into said mold; a lever rotatably mounted adjacent said feeder; speed accelerating gearing operably connecting said lever to said feeder for reciprocating said feeder at a faster rate and through a greater arc than said lever; a rotatable member spaced from said feeder; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs toward each other; and means for rotating said rotatable member for reciprocating said feeder, said ram portion being in said first position when said legs are closest together with the point of connection of the linkage member to the rotatable member being substantially closest to said feeder, said ram portion being in said second position under the urging of said spring when said point of connection is substantially furthest from said feeder.

8. A device for molding articles from plastic material, said device comprising: a hopper for the plastic material having a mold opening; a mold adapted to communicate with said mold opening; a rotatable feeder in the hopper adjacent said opening having a ram portion, said ram portion being reciprocable from a first position where said portion is away from said opening to a second position where said portion is closer to said opening and back again for intermittently forcing plastic material through said opening into said mold; a lever rotatably mounted adjacent said feeder; a gear operably attached to said feeder and said first gear and arranged for rotation at a faster rate and through a greater arc than said first gear to rotate said feeder at a faster rate and through a greater arc than said lever; a rotatable member spaced from said feeder; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs toward each other; and means for rotating said rotatable member for reciprocating said feeder, said ram portion being in said first position when said legs are closest together with the point of connection of the linkage member to the rotatable member being substantially closest to said feeder, and said ram portion being in said second position under the urging of said spring when said point of connection is substantially furthest from said feeder.

9. A device for molding articles from plastic material, said device comprising: a hopper for the plastic material having a mold opening; a rotatable axle extending transversely of said hopper; a feeder mounted on said axle and located adjacent to said opening, said feeder having a ram portion that is reciprocable from a first position where said portion is away from said opening to a second position where said portion is closer to said opening and back again for intermittently forcing plastic material through said opening; a mold adapted to communicate with said opening for receiving said plastic material; a lever rotatably mounted on said axle; a gear rotatably mounted on said axle and operably attached to said lever for rotation therewith; a second gear operably attached to said feeder and said first gear and arranged for rotation at a faster rate and through a greater arc than said first gear to rotate said feeder at a faster rate and through a greater arc than said lever; a resilient connector operably attached at one end to said feeder at a point spaced from the center of rotation of the feeder; a reciprocating member to which the other end of said resilient connector is attached; means for operating said reciprocating member to apply force to said resilient connector and thus rotate said feeder from said first to said second position; and a substantially rigid means operably connectable to said feeder and said reciprocating member for returning the feeder to said first position upon further operation of said reciprocating member.

10. A device for molding articles from plastic material, said device comprising: a hopper for the plastic material having a mold opening; a mold adapted to communicate with said mold opening; a rotatable axle extending transversely of said hopper; a feeder mounted on said axle and located adjacent to said opening, said feeder having a ram portion that is reciprocable from a first position where said portion is away from said opening to a second position where said portion is closer to said opening and back again for intermittently forcing plastic material through said opening into said mold; a lever rotatably mounted on said axle; a gear rotatably mounted on said axle and operably attached to said lever for rotation therewith; a second gear operably attached to said feeder and said first gear and arranged for rotation at a faster rate and through a greater arc than said first gear to rotate said feeder at a faster rate and through a greater arc than said lever; a rotatable member spaced from said feeder; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs toward each other; and means for rotating said rotatable member for reciprocating said feeder, said ram portion being in said first position when said legs are closest together with the point of connection of the linkage member to the rotatable member being substantially closest to said feeder, and said ram portion being in said second position under the urging of said spring when said point of connection is substantially furthest from said feeder.

11. A device for molding articles from plastic material, said device comprising: a hopper for the plastic material having a mold opening; a pair of feeders in the hopper adjacent said opening, each of said feeders having a ram portion; a mold adapted to communicate with said opening; and apparatus for reciprocating said feeders through a plurality of cycles with each feeder being moved from a first position where said ram portion is away from said opening to a second position where said portion is closer to said mold opening and back again for intermittently forcing plastic material through said opening into the mold, said ram portions being movable toward and away from each other during each cycle, said apparatus including a yieldable means exerting force sufficient to move said feeders from said first positions to said second positions.

12. A device for molding articles from plastic material, said device comprising: a hopper for the plastic material having a mold opening; a pair of rotatable feeders in said hopper adjacent said opening, each of said feeders having a ram portion; a mold adapted to communicate with said opening; a resilient connector operably attached at one end to said feeders at a point spaced from the center of rotation of at least one of the feeders; a reciprocating member to which the other end of said resilient connector is attached; means for operating said reciprocating member to apply force to said resilient connector and thus rotate said feeders from first positions where said ram portions are spaced from each other and away from said opening to second positions where said portions are adjacent each other and closer to said opening for forcing plastic material through said opening into the mold; and a substantially rigid means operably connectable to said feeders and said reciprocating member for returning the feeders to said first positions upon further operation of said reciprocating member.

13. A device for molding articles from plastic material, said device comprising: a hopper for the plastic material having a mold opening; a pair of rotatable feeders in the hopper adjacent said opening, each of said feeders having a ram portion with said ram portions being reciprocable from first positions where said portions are spaced from each other and away from said opening to second positions where said portions are adjacent to each other and closer to said opening and back again for intermittently forcing plastic material through said opening into the mold; a lever operably attached to said feeders for reciprocating said feeders; a rotatable member spaced from said feeders; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs towards each other; and means for rotating said rotatable member for reciprocating said feeders, said ram portions being in said first position when said legs are closest together with the point of connection of the linkage member to the rotatable member being substantially closest to said feeders, and said ram portions being in said second positions under the urging of said spring when said point of connection is substantially furthest from said feeders.

14. A device for molding articles from plastic material, said device comprising: a hopper for the plastic material having a mold opening; a pair of rotatable feeders in the hopper adjacent said opening, each of said feeders having a ram portion being reciprocable from first positions where said portions are spaced from each other and away from said opening to second positions where said portions are adjacent to each other and closer to said opening and back again for intermittently forcing plastic material through said opening into the mold; a lever rotatably mounted adjacent said feeders; a gear operably attached to said lever for rotation therewith; a second gear operably attached to said feeders and said first gear and arranged for rotation at a faster rate and through a greater arc than said first gear to rotate said feeders at a faster rate and through greater arcs than said lever; a rotatable member spaced from said feeders; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs toward each other; and means for rotating said rotatable member for reciprocating said feeders, said ram portions being in said first position when said legs are closest together with the point of connection of the linkage member to the rotatable member being substantially closest to said feeders, and said ram portions being in said second position under the urging of said spring when said point of connection is substantially furthest from said feeders.

15. A device for molding articles from plastic material, said device comprising: a hopper for the plastic material having a mold opening: a pair of substantially parallel rotatable axles extending transversely of said hopper adjacent to and on either side of said opening; a pair of feeders each mounted on one of said axles and each feeder having a ram portion with said ram portions being reciprocable from first positions where said portions are spaced from each other and away from said opening to second positions where said portions are adjacent to each other and closer to said opening and back again for intermittently forcing plastic material through said opening; a mold adapted to communicate with said opening for receiving said plastic material; a lever rotatably mounted on one of said axles; a gear rotatably mounted on said one axle and operably attached to said lever for rotation therewith; a second gear operably attached to said feeders and said first gear and arranged for rotation at a faster rate and through a greater arc than said first gear to rotate said feeders at a faster rate and through greater arcs than said lever; a resilient connector operably attached at one end to said lever at a point spaced from the center of rotation of the feeder; a reciprocating member to which the other end of said resilient connector is attached; means for operating said reciprocating member to apply force to said resilient connector and thus rotate said feeders from said first to said second positions; and a substantially rigid means operably connected to said lever and said reciprocating member for returning the feeders to said first positions upon further operation of said reciprocating member.

16. A device for molding articles from plastic material, said device comprising: a hopper for the plastic material having a mold opening; a pair of substantially parallel rotatable axles extending transversely of said hopper adjacent to and on either side of said opening; a pair of feeders each mounted on one of said axles and each feeder having a ram portion with said ram portions being reciprocable from first positions where said portions are spaced from each other and away from said opening to second positions where said portions are adjacent to each other and closer to said opening and back again for intermittently forcing plastic material through said opening; a lever rotatably mounted on one of said axles; a gear rotatably mounted on said one axle and operably attached to said lever for rotation therewith; a second gear operably attached to said feeders and said first gear and arranged for rotation at a faster rate and through a greater arc than said first gear to rotate said feeders at a faster rate and through greater arcs than said lever; a rotatable member spaced from said feeders; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs toward each other; and means for rotating said rotatable member for reciprocating said feeders, said ram portions being in said first position when said legs are closest together with the point of connection of the linkage member to the rotatable member being substantially closest to said feeders, and said ram portions being in said second position under the urging of said spring when said point of connection is substantially furthest from said feeders.

17. A device for molding articles from plastic material, said device comprising: a hopper for the plastic material having a mold opening; a mold adapted to communicate with said mold opening; a pair of substantially parallel rotatable axles extending transversely of said hopper adjacent to and on either side of said opening; a pair of feeders each mounted on one of said axles and each feeder having a ram portion with said ram portions being reciprocable from first positions where said portions are spaced from each other and away from said opening to second positions where said portions are adjacent to each other and closer to said opening and back again for intermittently forcing plastic material through said opening; a lever rotatably mounted on one of said axles; a gear rotatably mounted on said one axle and operably attached to said lever for rotation therewith; a second gear of larger diameter than the first gear and meshing therewith, said second gear being mounted on the other axle; a third gear mounted on said other axle; a fourth gear of substantally the same diameter as said third gear mounted on said one axle and meshing with said third gear; a resilient connector operably attached at one end of said lever at a point spaced from the center of rotation of the feeder; a reciprocating member to which the other end of said resilient connector is attached; means for operating said reciprocating member to apply force to said resilient connector and thus rotate said feeders from said first and second positions; and a substantially rigid means operably connected to said lever and said reciprocating member for returning the feeders to said first positions upon further operation of said reciprocating member.

18. A device for molding articles from plastic material, said device comprising: a hopper for the plastic material having a mold opening; a mold adapted to communicate with said mold opening; a pair of substantially parallel rotatable axles extending transversely of said hopper adjacent to and on either side of said opening; a pair of feeders each mounted on one of said axles and each feeder having a ram portion with said ram portions being reciprocable from first positions where said portions are spaced from each other and away from said opening to second positions where said portions are adjacent to each other and closer to said opening and back again for intermittently forcing plastic material through said opening; a lever rotatably mounted on one of said axles; a gear rotatably mounted on said one axle and operably attached to said lever for rotation therewith; a second gear of smaller diameter than the first gear and meshing therewith, said second gear being mounted on the other axle; a third gear mounted on said other axle; a fourth gear of substantially the same diameter as said third gear mounted on said one axle and meshing with said third gear; a rotatable member spaced from said feeders; a linkage member rotatably attached to said lever and to said rotatable member at a point spaced from the center of rotation of said rotatable member, said linkage member comprising a pair of legs rotatably mounted with respect to each other; a spring means having one end operably connected to said lever and the other end operably connected to the leg that is attached to said rotatable member; means for limiting the extent of movement of said legs toward each other; and means for rotating said rotatable member for reciprocating said feeders, said ram portions being in said first position when said legs are closest together with the point of connection of the linkage member to the rotatable member being substantially closest to said feeders, and said ram portions being in said second position under the urging of said spring when said point of connection is substantially furthest from said feeders.

19. A device for molding articles from plastic material, said device comprising: a hopper for the plastic material having a mold opening; a rotatable feeder in the hopper adjacent said opening having a ram portion; a mold adapted to communicate with said opening; a rotary member operably attached to said feeder for rotation therewith; means acting on said rotary member for rotating said rotary member and said feeder from a first position where said ram portion is away from said opening to a second position where said ram portion is closer to said opening for forcing plastic material through said opening into the mold, said acting means being yieldable when said plastic material provides a resistance of predetermined magnitude to movement of said feeder from said first position to a second position, and apparatus for reversing the movement of said rotary member and feeder for moving said ram portion from said second position to said first position.

HARRY H. HOLLY.

REFERENCES CITED

The following references are of record in the file of this patent:

UNITED STATES PATENTS

| Number | Name | Date |
| --- | --- | --- |
| 2,413,046 | Holly | Dec. 24, 1946 |